United States Patent [19]

Shannonhouse et al.

[11] Patent Number: 5,190,406

[45] Date of Patent: Mar. 2, 1993

[54] CATIONIC TREATMENT LANDFILL

[75] Inventors: Hugh P. Shannonhouse; Robert W. Styron, both of Marietta, Ga.

[73] Assignee: Municipal Services Corp., Kennesaw, Ga.

[21] Appl. No.: 806,640

[22] Filed: Dec. 13, 1991

[51] Int. Cl.$^5$ .............................................. B09B 1/00
[52] U.S. Cl. .................................................... 405/129
[58] Field of Search ............... 405/128, 129; 106/679, 106/708; 71/24

[56] References Cited

U.S. PATENT DOCUMENTS

| 4,624,604 | 11/1986 | Wagner et al. | 405/128 |
| 4,701,219 | 10/1987 | Bonee | 405/129 X |

FOREIGN PATENT DOCUMENTS

| 1053918 | 5/1979 | Canada | 405/129 |
| 292941 | 11/1988 | European Pat. Off. | 405/128 |
| 3041706 | 5/1982 | Fed. Rep. of Germany | 405/128 |
| 230439 | 12/1985 | German Democratic Rep. | 405/129 |

OTHER PUBLICATIONS

"Adsorptive Lignite Pre-Treatment of Seepage at the Cologne Municipal Refuse Dump", Moll et al. Vom Wasser vol. 74, pp. 13-25 (1990).

"Preparation of Cation Exchange Materials by Oleum Sulphonation of an Utrillas Spanish Lignite", Ibarra et al., Fuel vol. 63, Dec. 1984, pp. 1743-1747.

"The Use of Low Rank Brown Coal as an Ion Exchange Material" Lafferty et al., Fuel vol. 69, Jan. 1990 pp. 78-83.

"The Effect of Soil Properties and a Synthetic Municipal Landfill Leachate on the Retention of Cd, Ni, Pb and Zn in Soil and Sediment Materials", LaBauve et al., Journal Water Pollution, Federal, vol. 50, No. 3, Mar. 1988, pp. 379-385.

Primary Examiner—Randolph A. Reese
Assistant Examiner—John A. Ricci

[57] ABSTRACT

A landfill cell for the containment of MSW ash is defined in part by a depression in the ground bounded by a leachate impervious liner which forms the bottom and side walls of the cell, for continuous long-term protection of underyling and contiguous aquifers from contamination by heavy metals. The cell has a base layer of a natural cationic material in the form of amended and compacted lignite, which may be enhanced by the addition of about 6 to 12% lime by weight, extending in overlying relation to the liner along the bottom and along the side walls. An overburden of the waste ash material rests on the base layer, and at least one additional layer of amended lignite is positioned immediately above the first overburden, and at least one additional layer of the waste material overburden rests on the additional layer of cationic material. The lignite is ground to a small particle size of about 0.1 mm to 2.0 mm in size and has a CEC value of about 120 meq/100 g when enhanced by the addition of lime. A method of long term storage of MSW ash in a landfill cell includes the steps of forming a layer of such amended lignite in the landfill and applying an overburden of ash immediately above that layer, in which the cationic capacity of the layer is sufficient to immobilize at least 100% of the heavy metal ions capable of being leached from the overburden, adding a second such layer of material immediately above the overburden and then adding another layer of overburden of waste material over the second layer, and so on until the cell is filled and covered.

16 Claims, 2 Drawing Sheets

CATIONIC TREATMENT LANDFILL

BACKGROUND OF THE INVENTION

This invention relates to the continuous, long term treatment and containment of municipal solid waste such as incinerator ash and similar waste materials containing possibly elevated levels of heavy metals, and to landfill containment disposal cells and methods. The primary metals of concern are those which are identified by the EPA as having particular contaminant levels for inorganic chemicals, known as the eight "priority" metals. These are arsenic, cadmium, barium, silver, lead, mercury, chromium and selenium.

Cationic treatment of waste materials according to this invention involves the use of natural occurring cationic active material, that is, a material with high cationic exchange (CEC) value, placed in one or more layers in a disposal cell for the purpose of immobilizing the metals of concern, particularly lead, cadmium and mercury by a combination of CEC and pH. The invention is a viable solution to the concern that toxic metals may leach from the waste over hundreds or thousands of years in the cell and find their way through the underlying protective liner system into the groundwater aquifer.

The scientific principle of cation exchange is widely documented and accepted. The knowledge that certain natural occurring substances and soils have the power to exchange cations with solutions containing other cations was the outgrowth of observations dating back to the remote past. For example, it was known for centuries that liquid wastes become decolorized and deodorized when filtered through solids. For many years the term "base exchange" was used to describe the reaction, even long after it was established that the hydrogen ion may take part in the exchange reaction. In early experiments it was shown that when soils were mixed with ammonia and then leached with water, the greater part of the ammonia was held back.

The cationic exchange capacity (CEC) of any naturally occurring soil or substance is usually expressed in units of milliequivalents per 100 grams of soil or meq/100 g. A number of naturally occurring coals and soils are known to possess this property. The exchange mechanisms of lignite have been investigated since the 1930's. Lignite has high cation exchange capacity due to its clay and high organic content. These are known to increase CEC values in some soils up to levels as high at 500 meq/100 g.

Lignite removes metals from leachate by two principal mechanisms. Among the organic compounds in lignite are several that immobilize metals by complexing or chelating them. However, the principal capacity of lignite to immobilize metals is of ionic exchange. When cations in leachate encounter negatively charged sites or surfaces, the dissolved cations change places with cations already adsorbed at these sites. This is called cation exchange. Certain cations are preferentially exchanged, among them mercury, lead and cadmium. By this mechanism, metals of concern in MSW ash leachate can be adsorbed and immobilized by negatively charged functional groups and surfaces of lignite and thus removed from the leachate.

The selection order for adsorption of cations (Cationic Exchange Mechanism) by clays is as follows:

$Hg > Pb > Zn > Cd > Si > Mg > K > Na$

According to researchers, cadmium and zinc usually share an intermediate adsorption position when seven types of soil were tested.

The preferential selection order for cation adsorption in lignites is similar to that of clays, due to the high clay content and organic matter content of lignites. The following equation is an example of how a Cu+ ion in the water phase is attracted to a clay surfaces:

$$[Soil] Ca2+ + Cu2+ \rightarrow [Soil] Cu2+ + Ca2+$$

A similar equation for lignite would be expressed as follows:

$$[Lignite\ coal]\ Ca2+ + Pb2+ \rightarrow [Lignite\ Coal]\ Pb2+ + Ca2+.$$

As the CEC for a particular material increases, its capacity to immobilize trace metals that are preferentially adsorbed also increases.

In spite of extensive knowledge as to the ability of certain natural occurring soils and substances, such as clays, lignite, low rank brown coal and peat to immobilize metals, there seems to have been little effort to use these materials in a controlled manner in landfill cells, for the long-term containment of heavy metals to protect underlying and contiguous ground aquifers.

SUMMARY OF THE INVENTION

This invention is directed to a landfill cell and method for the containment of waste material, particularly MSW ash, in which natural cationic active material itself having a CEC value of at least about 50 meq/100 g is employed, in discrete positions, such as layers, to provide long-term control of heavy metal contaminants. In a preferred embodiment, the CEC value has been increased by the addition of lime to the lignite layer to stabilize the pH at a higher value.

Most of the metal contaminants, such as lead, cadmium and mercury, in waste material such as MSW ash, is in fact not available for leaching. Laboratory techniques, properly applied, can extract all or virtually all of these metals from such a waste substance. However, the natural near-surface conditions in a landfill cannot do this. Persons who are familiar with the manner in which metals are naturally distributed in earth materials, understand that anomalous concentrations have remained intact, and in place, for millenniums. While dispersion of metal by leaching is to be expected, the migration of metal is not in and of itself inevitable, and in natural conditions in which metals are covered by soil or rock, and the metals are in an unsoluble form, they often yield little or no trace of their presence by leaching.

The landfill cell of this invention is designed to protect the environment and the subterranean water supply, planning for the worst case conditions. In a preferred embodiment, the system of this invention involves the placing of a layer of "amended" cationic active material, preferably mixed with a small amount of lime at specific locations within a landfill cell. This included an initial layer, followed by one or more additional such layers as the overburden of waste material is added to the landfill.

In the preferred form lignite is used, primarily because of its low cost and availability in particular geographic regions. The lignite is "amended" or enhanced by crushing so that the particles do not substantially exceed 2.0 mm. The CEC of natural lignite may be about 85 meq/100 g and it may be increased to about 120 meq/100 g by adding 12% lime by weight and blending it with the crushed lignite. However, it is within the scope of the invention to use other cationic active materials with or without the addition of lime, which may be equally or even more effective, and may be economically attractive due to availability. Such other materials include brown coal, peat, sub-bituminous coal, and certain clays such as montmorillonite clay.

The amount of the CEC active material installed in such a landfill cell is related to the quantity of waste material, particularly to the quantity of available metals in such waste so that the thickness of any given cationic layer is sufficient to absorb and immobilize at least the major portion of the possible lead, cadmium, mercury and other heavy metal ions which can leach from the waste overburden material, in the expected pH range of the action layer. Generally, the extent of removal of heavy metal ions is one which takes the leachate at least to or below the Federal standards for drinking water.

The pH is preferably stabilized, and may be elevated to a higher pH, such as from about 9 to 11.8, by the addition of the lime, as previously mentioned. A high pH together with amendment of the lignite, reduces solubility since metal solubility commonly increases with low pH and decreases with high pH, except at very high pH, 12 or above. Such extreme low or high pH conditions would not be obtainable in natural conditions or in a cell constructed according to this invention.

Generally, the amount of cationic active material is in a quantity which has a CEC capacity much greater than that of all the heavy metals which would be expected to be leached from the waste material in any defined pH region or range. The cationic exchange capacities of the natural occurring materials will absorb the particular metals from any leachate and then will allow the balance of the water to filter slowly downwardly through the protective layers, free of these metals.

The following table lists typical CEC values for various materials:

TABLE I

| CEC Values for Lignite and Other Materials | |
|---|---|
| Material | CEC (meq/100 g) |
| Lignite Coal | 50-300 |
| Humus in Soils | 150-500 |
| Low Rank Brown Coal | 50-500 |
| Loam | 8-22 |
| Sand | 2-7 |

The rate of cationic exchange varies with the type of attenuator, the nature and concentrations of the cations, the predominant exchange mechanism, and the surface area of the particles. In general, the reaction rate in lignite is similar to clays. Apparently, exchanges on the edges of particles, as with lignite coal, can take place quickly.

Organic matter is the most effective contributor to high cationic exchange value and immobilization of metals in a given system. Lignite coals, due to both their organic matter and clay content, exhibit high cationic exchange capacities and are accordingly a preferred material to attenuate dissolved metals.

As mentioned above, the maintenance of a preferred pH range in the active layers of an MSW ash monofil, of the type contemplated by this invention, is important. Tests have shown, for example, that cadmium is soluble up to a pH of around 9. The addition of about 6-12% lime by weight assures a pH in excess of 9, but in any event, less than about 12.5. Not only does this increase the effective cationic exchange of the lignite layer, as previously noted, but reduces the amount of lignite which would otherwise be required, and reduces the opportunity for metals to go into solution. The maintenance of a desired pH range means that only very minute quantities of metals will dissolve into the leachate. As previously noted, it would require either a very low pH or in the case of lead, for example, either a very low or a very high pH to dissolve any substantial part of the metals contained in MSW ash within the disposal cell. Such levels of dissolution will be virtually impossible to obtain due to documented pH levels found in the natural ash, in lignite, as amended and particularly where a quantity of lime is added to elevate the pH to a stabilized and predicted condition.

The general principle applied by this invention is the placement of discrete layers of a naturally occurring cationic exchange material having a relatively high capacity, in a landfill disposal cell, to capture and retain the total available lead, cadmium and mercury found in the waste material. In determining the amount of materials used, the quantity of available or possible leachates are determined. The amount of treating material placed in the landfill is several orders of magnitude in effectiveness greater than a total metals available, taking into account the pH range which can be anticipated.

Lignite is preferred where available by reason of its costs and by reason of CEC activity. Lignite has certain high desirable characteristics, including the fact that when amended or ground to a particle size, as previously determined, it can in fact be compacted to a density of about 35 pounds per cubic foot or more at an optimum moisture of about 82%, but is not subject to channeling, fissures, or resolidification into a solid mass. A one foot thick layer of such lignite in granular form compacted to 38.7 lbs./cu. ft. has a measured permeability of $2.1 \times 10^{-4}$ centimeters per second. It is not susceptible to cracking because of its inherent granular nature, and has a self-healing characteristic allowing it to withstand and in fact absorb small movements of the earth.

Also, amended lignite will not resolidify. A representative sample of such material has been subjected to a confining pressure of 16,000 pounds per square foot, a load which represents about two times the maximum anticipated load in the cell, with no indication of resolidification. Research indicates that the resolidification process for the lignite to become a semi-rigid body requires burial at a depth of the order of several thousand meters and submission to temperatures in the order of 50° C.–100° C. for a period of geologic time. Further, it has been that the addition of up to 12% lime does not result in the cationic mass becoming hard. Drying tests show that if the same is vacuum dried to about 20-30% moisture, slight fissures or cracks may result, which are rehealed when the normal moisture content is reestablished. Even then, such cracks did not extent through the layer, but were evidenced more in the nature of mere surface cracks, and disappear when moisture content is reestablished.

A base or primary treatment layer is constructed, for example, above a layer of protective sand employed at the bottom of the cell for leachate filtration and drainage into the collection system, as well as for physical protection of the HDPE (high density polyethylene) liner. Secondary or tertiary layers are placed in relation to the over-burden of waste material, and the thickness or space between such treament layers as well as the thickness of the cationic layers are determined by the total heavy metal content of the waste, such as MSW ash, and the cationic exchange capacity of the naturally occurring treatment material which is added in discrete layers. The layers are thus positioned and proportioned so as to provide 100% or more treatment capacity for preferentially removing each of the heavy metals of concern, at least to a level at or below Federal drinking water standards for each metal of concern.

It is accordingly an important object of this invention to provide a landfill cell and method, for the containment of waste material, and for immobilization of heavy metals which may be present in leachates from such material for continuous long-term protection of ground aquifers.

A further object of the invention is the provision of a landfill cell, and method, as outlined above, which employs one or more discrete layers of a natural cationic active treatment material, which has a CEC value of at least 50 meq/100 g, such as an amended lignite.

A further object of the invention is the provision of a landfill cell, and a method of treatment, as outlined above, employing naturally occurring cationic materials such as low-grade coals, or the like, in which the CEC value or capacity of such materials is related to the known quantity of specific heavy metals contained within the material being landfilled.

Another object of the invention is the addition of lime to a crushed layer of lignite to elevate and stabilize the pH in such layer and embrace the CEC thereof.

These and other objects and advantages of the invention will be apparent from the following description, the accompanying drawings and the appended claims.

BRIEF DESCRIPTION OF ACCOMPANYING DRAWINGS

DESCRIPTION OF THE PREFERRED EMBODIMENT

Figure 1:
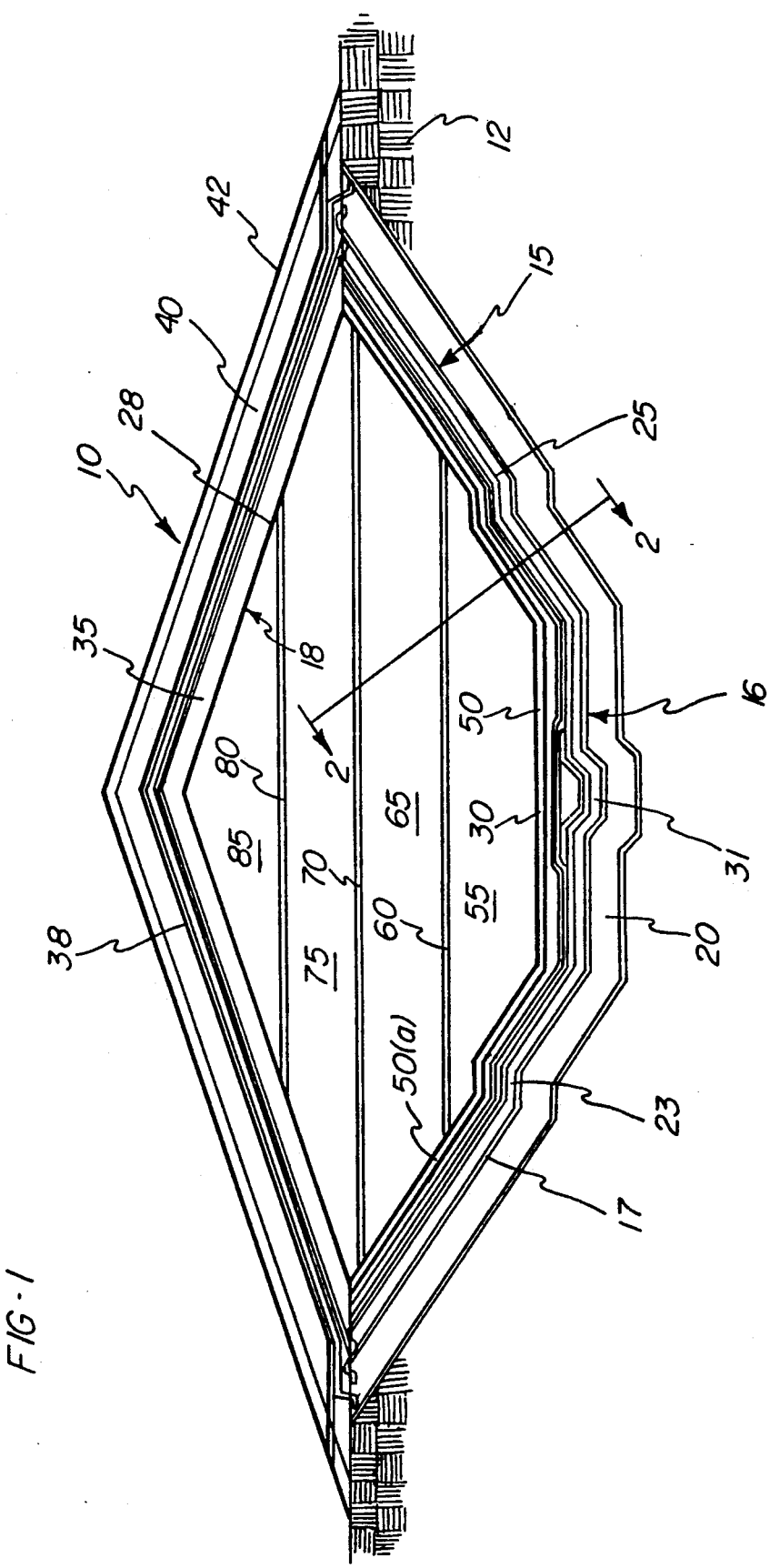
FIG. 1 is a diagrammatic sectional view through a landfill cell in accordance with this invention.

Referring to the drawings, which illustrate a preferred embodiment of the invention, a landfill cell incorporating cationic treatment and containment for heavy metals is illustrated generally at 10 in FIG. 1. It will be understood that the layered construction of the base and liner of the cell 10 as well as that of the top has been exaggerated in thickness for the purpose of illustration.

The landfill cell according to this invention is for the containment of waste material of the kind which is normally landfilled, and may be a monofil for municipal solid waste (MSW) ash, although the principles of this invention are not limited to a monofill arrangement. The cell 10 is defined at least in part by a hole or depression in the ground 12. In accordance with landfill technology, the depression is bounded by means which define a leachate impervious liner 15 which forms the base of the cell 10, defined generally by a leachate collection bottom 16, surrounding side walls 17, and an enclosing cover or top 18.

The particular construction of the liner 15, which is commonly a composite of known materials, is not considered to be a critical part of this invention, and landfill techniques employing composite liner materials of various kinds, as well as composite top sealants may be used with this invention as known in the art. The EPA has provided guide lines for the construction of self-contained landfill cells, and the cell described for the purpose of illustrating this invention may be defined as a double-lined, double-leachate collection design which has been constructed and used in a number of existing locations, an example being that of a 3.5 acre cell operated by Wheelabrator Environmental Systems, Inc. in Newport, N.H., accepting ash from Claremont, N.H. Mass Burn Facility.

Figure 2:
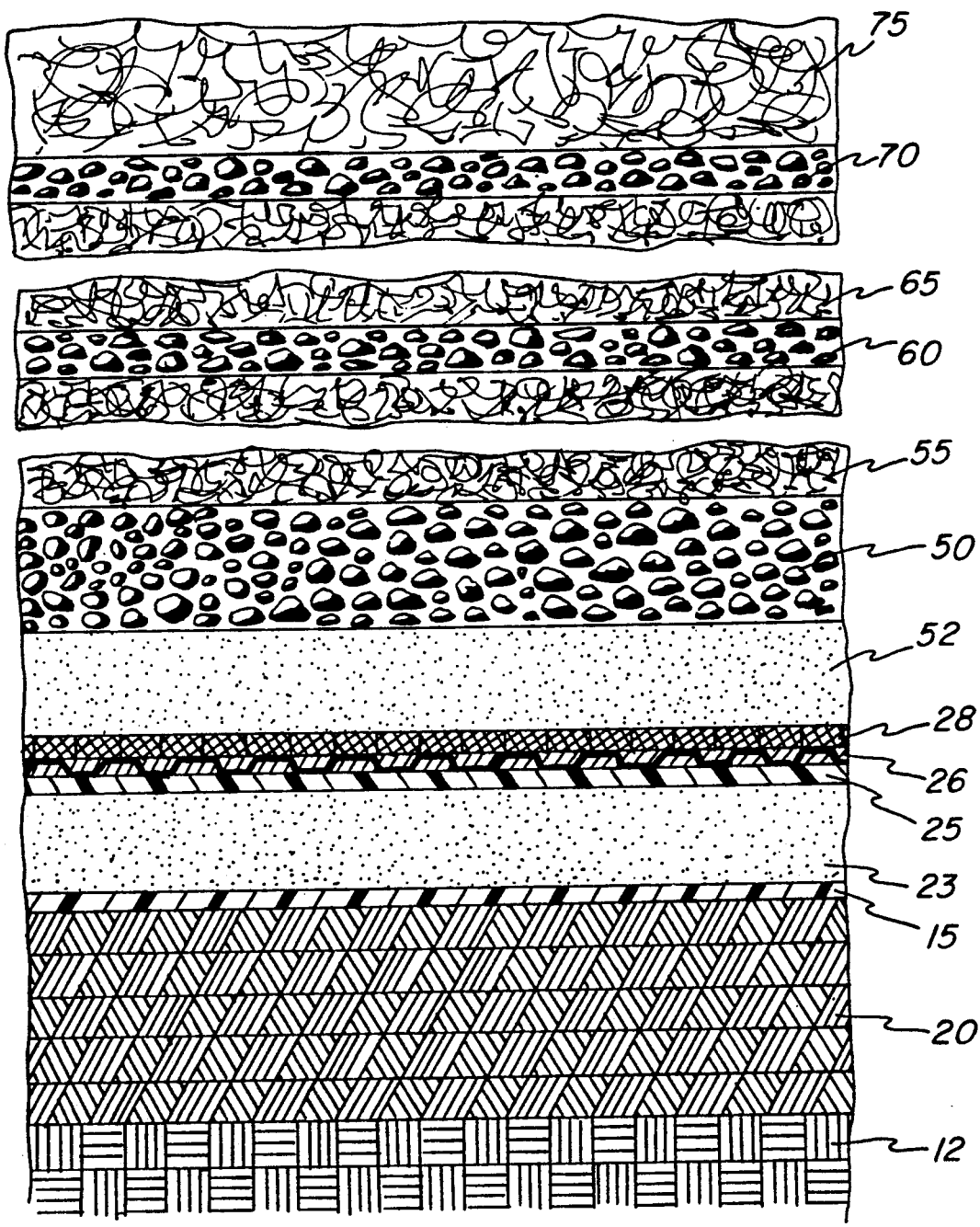
FIG. 2 is an enlarged diagrammatic sectional view through the cell, generally along the line 2—2 of FIG. 1.

Referring for this purpose to FIG. 2, the base of the landfill pit formed in the ground 12 may comprise 5 foot of compacted clay 20 on top of which is positioned the liner 15 in the form of a 60 mill impervious sheet of HDPE. As presently understood, HDPE is a preferred barrier material due to its stability and its resistance to high pH over a long period of time. On top of the liner 15 is about 1 foot of compacted screened sand 23. Immediately on top of the sand is positioned an additional HDPE synthetic liner 25, which may be 80 mill in gauge. Also, the liner 25 immediately supports on its upper surface a geotextile draining net 26 and a nonwoven filter fabric 28 (FIG. 2). Such a landfill is considered to be double-lined in view of the two water impervious barrier lines 15 and 25 which are configured or formed at the pit bottom to provide first and second leachate collection sumps 30 and 31.

Sheet or liner 25 provides for collection of leachate at the sump 30. In the event that this barrier becomes compromised, the backup barrier formed by the liner 15 leading to the sump 31 would be effective, with the leachate being screened through the sand layer 23. If, in the event both HDPE layers or liners become compromised, the subsoil itself is engineered or designed to become effective in environmental protection, and in the particular cell as illustrated in FIGS. 1 and 2, the compacted layer 20 of clay, essentially water impervious, is engineered to provide a final barrier. Obviously, the actual design of the cell structure in regard to the underburden or supporting material depends considerably upon the soil structure of the area.

The filter fabric 28 and the geotextile drainage net 26, positioned at the immediate upper surface of the primary barrier liner 25, as shown in FIG. 2, serves to protect this barrier or liner against mechanism or physical injury.

The particular design of the cover 10 is not considered to be a critical part of this invention, as many cover configurations have been used for landfill cells and have been found to be satisfactory. The particular cover 28 illustrated in the cell 10 in FIG. 1 includes a first overburden of a layer 35 of compacted clay, and a three-layer water impervious composite 38 consisting of a 60 mill HDPE liner, a geotextile drainage net, and a nonwoven filter fabric, as previously described, positioned on the upper surface of the clay layer in the order given followed a selected soil 40 and top soil 42 overburden. Further designs and discussions of landfill covers are contained in the Environmental Protection Agency report EPA-60/21-79-165 "Design and Construction of Covers for Solid Waste Landfills" dated August 1979. (NTIS Accession No. PB80-100381).

In the practice of this invention, a first layer 50 of a natural cationic active material is applied along the sides and bottom of the cell 10. It may be applied on the top of an intermediate or second layer of screened sand 52. The material in the layer 50 is lignite which has been crushed or ground to a relatively fine state prior to placing in the landfill cell in order to provide an optimum surface area. The final product, as processed, should be comparable to a crusher run of limestone with larger particles not exceeding one-quarter to one inch in diameter, but with a major portion of the particles crushed to a size of approximately 0.1 to 2.0 mm. The lignite, thus amended, is blended under moist conditions with about 6–12% lime by weight before being applied to the cell.

While lignite is preferred, the material making up the layer 50 should be a naturally-occurring substance selected from the group including lignite, brown coal, peat, and sub-bituminous coal, with a CEC value of at least 50 meq/100 g. As previously noted, when lignite is used combined with lime, the effective CEC value rises from a base of 85 for the lignite up to 120 for the blend. The cationic active material is spread out in a layer of generally uniform thickness extending from wall to wall of the cell and compacted into place. Also, the first layer 50 is extended up and along the walls of the cell.

An overburden of waste material is layered on top of the first layer or base layer 50. The waste material 55 in a monofill landfill cell may consist of the combined ash from a mass burn municipal solid waste incinerator. Such combined ash includes approximately 20–30% fly ash, and boiler ash, with the remainder in the form of bottom ash. The material may be wet or dry, but is usually hauled to the landfill in a damp or wet state, and is handled with conventional waste material handling equipment, such as dump trucks and moved by bulldozer. When it is loaded in the landfill, it is applied directly to the top of the cationic material layer 50 to a given thickness, as discussed below.

A feature of the invention is that the effective quantity of the cationic active material 50 is related to the total available heavy metals content of the waste material, so that the effective capacity of the layer 50 equals or exceeds 100% of the heavy metals in question. Commonly, the principal metals of concern are lead, cadmium and mercury, although it should be understood that a immobilizing cationic exchange occurs over a wide spectrum of metals, including chromium, zinc, silver, iron, arsenic, selenium, copper and manganese. Also, the pH of the leachate may be taken into consideration in determining the desirable quantity of lime and the cationic active material, as well as the CEC value of such material.

Table II below illustrates typical conditions and examples of MSW ash. As shown in Table II, typical values of cadmium may vary from as low as 25 mg/kg of ash, up to 50 or more. Of course, much depends on the origin of the ash itself. Similarly, it is not uncommon to see lead in the ranges of 750 to 2,000 mg/kg, and mercury in ranges from less than 10 mg/kg of ash up to 20. Therefore, the metal concentrations as illustrated in Table II are merely typical of MSW ash, but no one particular concentration may be considered as typical or representative. These values in Table II are then converted into grams of metal per cubic foot of ash at the four densities shown. These, then, represent the total content of the three metals stated, which could possibly be removed by proper chemical procedures from the ash, but of course, far exceed the metals which could be leached from the ash in any possible pH range occurring within a cell according to this invention.

TABLE II

| Metal Concentrate mg/kg ASH | | Grams of Heavy Metal in One Cubic Foot of MSW Ash | | | |
|---|---|---|---|---|---|
| | | Density of Ash (lb/Cu. ft.) | | | |
| | | 60 | 65 | 70 | 75 |
| Cd | 25 | 0.68038 | 0.7371 | 0.79378 | 0.8505 |
| | 45 | 1.22469 | 1.32675 | 1.4288 | 1.5309 |
| | 50 | 1.36077 | 1.47417 | 1.58756 | 1.7010 |
| Pb | 750 | 20.4116 | 22.1125 | 23.8135 | 25.5144 |
| | 1,500 | 40.8231 | 44.2250 | 47.6270 | 51.0288 |
| | 2,000 | 54.4308 | 58.9667 | 63.5026 | 68.0385 |
| Hg | 10 | 0.2722 | 0.2948 | 0.3175 | 0.3402 |
| | 15 | 0.04082 | 0.04423 | 0.4763 | 0.5103 |
| | 20 | 0.5443 | 0.5897 | 0.6350 | 0.6804 |

On the other hand, considering a given CEC capacity of lignite, and assuming a cubic foot of lignite compressed to a density of 40 lbs. per cubic feet (a relatively low value when considering the pressure added by the weight of the overburden), having a CEC of 100 meg/100 g. This cubic foot has the capacity of treating 1,020 grams of cadmium. The same amount of material can absorb 1,880 grams of lead or 1,820 grams of mercury. Of course, higher compaction of the cationic active material provides for greater capacity and greater efficiency. Similarly, higher and/or lower CEC ratings result in proportionally higher or lower total exchange capacities.

As an example of the calculation for the design of a given treatment cell capable of handling 490,000 tons of MSW ash in accordance with this invention, one can first determine the total quantities of each metal of interest that could be potentially present in a given quantity of ash. Assuming average concentrations per 1,500 mg per Kg of lead, 50 mg per Kg of cadmium and 10 mg per Kg mercury, then one can determine the total or gross quantities of such metal components, assuming a conservative ash density of about 74 pounds per cubic foot as follows: 490,000 tons of ash equals 735 tons Pb, 24.5 tons Cd and 4.9 tons Hg.

Next, for each of the three metals stated, one can calculate the number of tons of cationic active material, such as lignite, assuming a particular CEC necessary to immobilize 100% of the metals involved, and assuming the extremely unlikely combination of events that a) 100% of the metals somehow become soluble, and b) sufficient leachate passes down through the cell over time to dissolve the metals and convey them to the lignite layers. At only 85 CEC, 100 grams of lignite will capture and react with 8.8 grams of lead, 4.76 grams of cadmium, or 8.54 grams of mercury. Therefore, the following conditions exist:

$$735 \text{ tons Pb} \times \frac{100 \text{ g lignite}}{8.80 \text{ g Pb}} = 8352.27 \text{ tons lignite}$$

$$24.5 \text{ tons Cd} \times \frac{100 \text{ g lignite}}{4.76 \text{ g CD}} = 514.71 \text{ tons lignite}$$

$$4.90 \text{ tons Hg} \times \frac{100 \text{ g lignite}}{8.54 \text{ g Hg}} = 57.38 \text{ tons lignite}$$

Total lignite necessary = 8924.36 tons

The above calculations are based on dry lignite. It is necessary to convert lignite into cubic yards, and knowing that the maximum dry density of lignite is about 40.6 pounds per cubic feet, if we assume that 90% of the standard Proctor density is obtained in the field, the "in-place" density will be approximately 36.5 pounds per cubic foot. The volume (not weight) of lignite which would be needed to capture all of the metals in the example of 490,000 cubic yards of ash is:

$$8924.36 \text{ tons} \times \frac{2000 \text{ lb}}{1 \text{ ton}} \times \frac{\text{ft}^3}{36.5 \text{ lb}} \times \frac{1 \text{ yd}^3}{27 \text{ ft.}3} = 18,111.3 \text{ yd}^3$$

In order to determine the quantity of lignite which must be purchased and shipped from the mine, assuming an as-received moisture content of 53.24%, the weight of water must be added to the dry weight of 8,924 tons resulting in a total of 13,676 tons of as-received lignite for the containment cell in question.

The above example is stated in terms of a cationic active material with a CEC of 85 meq/100 g. When this is increased to 120 meq/100 g by the addition of lime, as previously described, the total tonnage of lignite required may be reduced to 6,323 dry tons, with an as-received shipping weight 9,690 tons, and with a volume of 12,832 cubic yards.

A concept of this invention is the application in the cell of additional or secondary cationic treatment layers such as the second active layer 60 shown in FIG. 2, followed by a second overburden layer 65 and a third cationic active layer 70 followed by a further overburden layer 75, etc., until the landfill is in a condition to be closed. The primary and secondary cationic treatment layers provide protection not only after the landfill is sealed and closed, as illustrated in FIG. 1, but also provides protection during the time that the landfill is in use and is therefore open and subject to environmental weather conditions of rain and snow.

As previously noted, the cell designed according to this invention is capable of removing all of the lead, cadmium and mercury in MSW ash should such material somehow become totally soluble and leach into water. However, such is extremely unlikely in the typical MSW ash pH ranges of between about 6 and about 8, which has been found in MSW leachate. It should also be noted that very little, if any, mercury has been found in such ash using TCLP procedures or in actual field samples. In fact, with MSW ash the heavy metals of interest using TCLP procedures usually leach out at or below current Federal drinking water standards.

Returning to the example of a landfill cell for retaining 490,000 tons of MSW ash, in order to provide a very substantial margin of safety, a cell, as illustrated in FIGS. 1 and 2, has been designed to use a total of 20,923 cubic yards of amended lignite representing a total vertical depth of 24 inches. As shown in FIG. 1, the typical landfill cell which has been constructed to use the features of this invention will be formed with sloping sides and will be filled with a sloping top. Accordingly, the capacity of the cell increases as it is filled, and then begins to decrease again at the top. Accordingly, in order to obtain optimum advantage of the distribution of layers of cationic active material, the intermediate layers are preferably of a relatively uniform thickness, but the spacing of these layers with respect to the spacing of the overburden may be varied for the purpose of optimizing the distribution of this material.

In one specific example, the lignite will be distributed in the following manner: The base layer or first layer 50 is 12 inches thick and represents 4,358 cubic yards of material. It is preferred that this first layer or base layer extend up the side slopes as indicated at 50a in FIG. 1. The thickness on the sides 50a to continue at 12 inches or half the way up, and six inches the rest of the way, adding 6,495 cubic yards to the total.

A 17 foot, 8 inch overburden of waste material, specifically MSW ash 55, will be applied to the base layer 50 and to the included side layers 50a. The top of this first overburden layer 55 will be graded flat so that a second layer of amended lignite may be added. In the example shown, the ash layer 55 will consist of 2,705 cubic yards of material, and the second or intermediate treatment layer applied on top of the first overburden layer will be four inches thick and consist of 2,705 cubic years of treatment material. On top of the layer 60, a second overburden layer of about 25 feet thickness will be applied, and on top of this, a further intermediate or secondary treatment layer, four inches thick, will be applied. The second intermediate treatment layer 70 will represent a volume of 3,796 cubic yards of crushed lignite.

The third overburden layer in the specific example shown will be about 10 feet in height and will rest on the treatment layer 70. The further treatment layer 80 thereover will be four inches thick and represent 3,569 cubic yards of amended lignite, with a fourth overburden layer 85 resting thereon and immediately under the cover. In this manner, 20,923 cubic yards of amended lignite will be used to treat 490,000 cubic yards of ash. It will be understood that a more uniform placement depth of the alternating treatment and waste layers may be preferred in future cell constructions.

The addition of lime to the CEC active layers stabilizes and elevates the pH. The addition of lime, for example, would be helpful in those instances where an abnormally low pH could leach out certain metals, such as iron or lead, in such quantities as to consume a major portion of the available ionic exchange capacity. The use of lime also could be particularly helpful where the waste material includes a large percentage of cadmium, lead or mercury, which are high on the preferential selection list, or includes large quantities of other metals such as iron, copper, manganese and zinc, which at very low pH levels, would be released. Thus, the use of a sufficient quantity of lime in a cell could assure a maintenance of a pH range is excess of 7, such as for example about 9.2-10, which would reduce the risk of premature utilization of the available cationic exchange value.

While the addition of lime is optional, its use is considered to be preferred and provides several distinct benefits. First, the lime increases the cationic efficiency of any particular treatment layer by reason of the increase in CEC value, noted above. In the example given above where 18,111 cubic yards of lignite would be required in a cell with a CEC value of 85, less than 13,000 cubic yards of lignite amended or blended with 12% lime with a CEC value of 120 would be required for complete containment of the same amount of MSW ash.

Second, the use of about 6 to 12% lime and lignite ground to a fineness of about 0.1 to 2.0 mm has been found, in tests, to provide a pH range of from about 8.8 to 11.8 in the active layer, but which should not exceed 12 in natural conditions. The solubility of leachates containing lead, cadmium and mercury indicate that the lower end of the solubility curve is at a pH of of about 2 or less (very high acid content) and solubility begins to occur again at a pH of above 12.0. The treatment system, which includes a small quantity of lime in an amended or crushed lignite provides protection if, for some unforeseen and unlikely reason, the pH in the MSW ash being contained were to decrease. Due to cationic exchange and high pH at the point of contact, the metals of concern are removed by both precipitation from solution and by cation exchange.

Another advantage in the employment of a quantity of lime substantially in the range previously described, is the fact that cadmium can remain soluble up to a pH of about 9.0, at which point it is precipitated out. Also, any lead which has gone into solution will precipitate out at a pH of 8.0 or higher. Therefore the addition of the small quantity of lime providing a pH generally at 9 or above, not exceeding 12, has the additional advantage of providing an environment, in the cationic layer, which results in the elimination of such metals from a solution. It should be remembered that the flow through the cationic layers of the leachate is at a very slow rate since the contact time within the treatment layers is expected to represent a long period of time, in terms of many years, to traverse the thickness of the several layers, and ample opportunity is presented for metal precipitation and cationic exchanges.

The layers 50, 60, etc. in time will become a stabile yet rich or concentrated source of heavy metals. As defined layers, they may warrant extraction at some time in the future for their intrinsic value.

While the process and product herein described constitute preferred embodiments of this invention, it is to be understood that the invention is not limited to this precise process and product, and that changes may be made therein without departing from the scope of the invention which is defined in the appended claims.

What is claimed is:

1. In a landfill cell for the containment of waste material defined at least in part by a depression in the ground, which depression is bounded by a leachate impervious means defining the bottom and the side walls of the cell, the improvement in the immobilization of heavy metals present in leachate from such waste material for the continuous long-term protection of underlying and contiguous ground aquifers, comprising:
   a first leachate permeable layer of a natural cationic active material have a CEC value of at least 50 meq/100 g, said material extending in overlying relation to said liner means over said bottom and to said side walls and forming a base layer, a first overburden of such waste material positioned immediately above said base layer, the thickness of said base layer being sufficient to absorb and immobilize a major portion of the lead, cadmium, and mercury metal ion leachates from said overburden,
   at least one additional said leachate permeable layer of said cationic active material positioned immediately above said first overburden, and
   at least one additional said waste material overburden material positioned above said additional layer of cationic active material.

2. The landfill cell of claim 1 in which said cationic active material is selected from a group consisting of lignite, brown coal, peat, and sub-bituminous coal.

3. The landfill cell of claim 1 in which said cationic active material comprises crushed lignite to a size in which the largest particles do not exceed one inch in diameter and with a major portion of the particles are of approximately 0.1 mm to 2.0 mm in diameter.

4. The cell of claim 3 in which said cell is a monofil, said waste material is MSW ash, in which said first layer is about 1 foot thick, and in which said first overburden is about 25 feet thick.

5. The cell of claim 3 in which said cationic active material includes about 6 to 12% lime by weight.

6. In a landfill cell for the containment of waste material containing heavy metals which are subject to leaching from such waste material, the improvement comprising:
   at least one layer of crushed compacted lignite having an average particle size of about 2 mm and less, said layer being positioned in immediate underlying relation to said waste material, such that leachate from said waste material will pass through said one layer,
   said one layer having a CEC value of at least 50 meq/100 g and having a cationic capacity sufficient to immobilize at least 100% of the available heavy metal ions which can be released by said waste material in a leachate.

7. The landfill cell of claim 6 in which said one layer includes about 6 to 12% lime by weight.

8. The method of storing waste material in a landfill in which said material forms a leachate containing heavy metals, comprising the steps of:
   forming a layer of leachate pervious natural cationic active material in said landfill having a CEC value of at least 50 meq/100 g,
   applying an overburden of said waste material immediately above said layer,
   the cationic capacity of said layer being sufficient to immobilize at least 100% of heavy metal ions capable of being leached from said overburden; and
   adding a second layer of said cationic active material immediately above said overburden of waste material, and adding a second said overburden of waste material over said second layer.

9. The method of claim 8 in which said waste material is municipal solid waste ash.

10. The method of claim 8 in which said cationic active material is selected from a group consisting of lignite, brown coal, peat, and sub-bituminous coal.

11. The method of claim 8 in which said cationic active material is crushed lignite blended with about 6 to 12% lime by weight.

12. The method of claim 11 in which said lignite is crushed to a size of from about 0.1 mm to 2 mm.

13. The method of claim 8 including the further step of applying a water-impervious cover to said landfill.

14. The method of long term storing of ash from the incineration of municipal solid waste in a landfill cell, comprising the steps of forming a water impervious liner at a bottom of such cell, covering said liner with a layer of cationic active material in the form of crushed lignite and applying to such material an overburden of said ash in a quantity which is related to the quantity of lignite such that the total cationic capacity of said lignite layer is sufficient to immobilize at least 100% of the heavy metal ions which are capable of being leached in said cell from said overburden.

15. The method of claim 14 comprising the further steps of adding a second said layer of crushed lignite immediately above said overburden layer of ash, and adding a second overburden layer of ash immediately on top of said second lignite layer, said quantity of said overburden being related to the cationic capacity of said second layer such that the cationic capacity of said second layer is sufficient to immobilize at least 100% of the heavy metal ions capable of being leached from said second overburden.

16. The method of claim 14 including the step of blending lime with said lignite in a ratio of about 6–12% lime by weight of said lignite prior to said covering step.

* * * * *